United States Patent
Kim

(10) Patent No.: US 10,203,682 B2
(45) Date of Patent: Feb. 12, 2019

(54) POSITION CONTROLLER FOR CONTROLLING A ROTATION CENTER OF A TILTING HEAD

(71) Applicant: DOOSAN MACHINE TOOLS CO., LTD., Changwon-si, Gyeongsangnam-do (KR)

(72) Inventor: Hyon-Seok Kim, Changwon-si (KR)

(73) Assignee: DOOSAN MACHINE TOOLS CO., LTD., Changwon-si, Gyeongsangnam-do (KR)

( * ) Notice: Subject to any disclaimer, the term of this patent is extended or adjusted under 35 U.S.C. 154(b) by 36 days.

(21) Appl. No.: 15/486,677

(22) Filed: Apr. 13, 2017

(65) Prior Publication Data

US 2017/0357237 A1 Dec. 14, 2017

(30) Foreign Application Priority Data

Jun. 14, 2016 (KR) .................. 10-2016-0073597
Aug. 18, 2016 (KR) .................. 10-2016-0105060

(51) Int. Cl.
*G05B 19/31* (2006.01)
*G05B 19/401* (2006.01)

(52) U.S. Cl.
CPC ......... *G05B 19/31* (2013.01); *G05B 19/4015* (2013.01); *G05B 2219/37014* (2013.01); *G05B 2219/49121* (2013.01); *G05B 2219/49178* (2013.01); *G05B 2219/50026* (2013.01); *G05B 2219/50031* (2013.01);

(Continued)

(58) Field of Classification Search
CPC .......................... G05B 19/31; G05B 19/4015
See application file for complete search history.

(56) References Cited

U.S. PATENT DOCUMENTS 4,899,094 A * 2/1990 Pilborough ........ G05B 19/4015
318/567
5,329,457 A 7/1994 Hemmerie et al.
(Continued)

FOREIGN PATENT DOCUMENTS

EP 1549459 A2 4/2004

OTHER PUBLICATIONS

Extended European Search Report dated Nov. 20, 2017, corresponding to European Application No. 17172804.1, citing the above reference(s).

*Primary Examiner* — Vincent H Tran
(74) *Attorney, Agent, or Firm* — Hauptman Ham, LLP

(57) ABSTRACT

Disclosed is a position controller for a tilting head in a machining center. The position controller includes an offset attachment having a body combined to the tilting head and a spherical contact secured to the body, an offset detector built in the machining center such that the offset detector move out into a process area of the machining center and automatically detects a tool offset from a contact point with the spherical contact, a storing unit individually storing first and second tool offsets by respective rotation positions of the tilting head, and an operator generating a transform offset of the first tool offset by a rotational transform and a center error vector from the transform offset and the second tool offset. Accordingly, the center error of the tilting head is automatically detected and corrected in the machining center.

6 Claims, 6 Drawing Sheets

(52) U.S. Cl.
CPC ........... *G05B 2219/50137* (2013.01); *G05B 2219/50297* (2013.01); *G05B 2219/50334* (2013.01)

(56) References Cited

U.S. PATENT DOCUMENTS

| | | | |
|---|---|---|---|
| 6,865,498 B2* | 3/2005 | Hardesty | G05B 19/401 702/95 |
| 7,245,982 B2 | 7/2007 | Morfino | |
| 2009/0183610 A1* | 7/2009 | Maxted | G05B 19/401 82/1.11 |
| 2010/0207567 A1 | 8/2010 | Mori et al. | |
| 2011/0093115 A1* | 4/2011 | Katoh | G05B 19/404 700/191 |
| 2013/0151001 A1* | 6/2013 | Haase | G01B 21/042 700/192 |
| 2013/0253871 A1* | 9/2013 | Gray | B23Q 17/22 702/95 |

\* cited by examiner

POSITION CONTROLLER FOR CONTROLLING A ROTATION CENTER OF A TILTING HEAD

PRIORITY STATEMENT

This application claims priority under 35 U.S.C § 119 to Korean Patent Application No. 10-2016-0073597 filed on Jun. 14, 2016 and Korean Patent Application No. 10-2016-0105060 filed on Aug. 18, 2016 in the Korean Intellectual Property Office, the contents of which are hereby incorporated by reference in their entirety.

BACKGROUND

1. Field

Example embodiments relate to a position controller for controlling a rotation center of a tilting head, and more particularly, to a position controller for automatically correcting a position error with respect to the rotation center of the tilting head in a machining tool.

2. Description of the Related Art

Recently, the demand for complicated and elaborate mechanical products has sharply risen according to the development of the precise mechanical industry such as an automobile industry, a shipbuilding industry and an airline industry. Most of the recent mechanical products tend to be manufactured in a single machining process by a numerical control (NC) machines across various sizes and configurations from small and minute machine elements to tremendous large-scale mechanical structures. Recent machining tools have been developed to a machining center in which processing machines are provided together with supporting machines such as an automatic tool changer (ATC) and an automatic attachment changer (AAC). The processing machines and the supporting machines are automatically controlled together with one another under the numerical controller in the machining center.

In a conventional machining center, an object is secured to a rotatable table on a stationary bed and the machining tools are combined to the tilting head of a spindle assembly. The tilting head can linearly move in x, y and z axes in a Cartesian coordinate system and can rotate with respect to its own central axis, so the object is usually processed by the relative motions between the object and the machining tools in the machining center. Particularly, the motions of the table and the tilting head makes it possible to conduct a 5-axis machining in a single machining center and the object can be processed into the complicated and elaborate mechanical products in a single machining center.

A position correction or an offset correction of a tool is generally required as the preparation processes for the machining center. For example, a control position of the tool is algorithmically calculated in a virtual processing space by using a virtual coordinate system of the numerical controller and an actual position of the tool is manually obtained in an actual processing space by using a specific coordinate system on the actual table or bed of the machining center. Thereafter, the position error between the control position and the actual position of a tip point of the tool, which is widely referred to as tool offset, is obtained and the tool offset is to be corrected ion such a way that the control position coincides to the actual position by the offset correction.

The machining center involves various inherent errors such as an assembly error, an operation error and an installation error, so that the control position of the tool is necessarily deviated from the actual position. Since the machining center is made up of various components such as the table, the spindle head and the column, each of the components has its own assembly error that is caused by the assembly of each component and the operation error that is caused by the usage or the operation conditions or environments of each component. In addition, when each of the components is installed to the machining center, the installation error inherently occur in the machining center. Therefore, the machining center inherently has the tool offset due to the assembly error, the operation error and the installation error.

An offset detector is generally built in the machining center and the tool offset is detected at the tip point of the tool by the offset detector. Then, the numerical controller shifts the virtual coordinate system by a parallel transference in such a way that the origin of the virtual coordinate system coincides with that of the actual coordinate system according to the detected tool offset (coordinate correction). Thus, the offset correction makes the control position of the tip point of the tool coincide with the actual position thereof and the tool offset is accurately corrected in the machining center. As a result, the object can be accurately processed under the control of the numerical controller in the machining center without any tool interferences to the object due to the tool offset.

However, when the spindle head itself is rotated with respect to its own central axis just like the tilting head, the tool offset of the tool is not sufficiently corrected just by the coordinate correction. That is, the position error of the rotation center of the tilting head may occur in the corrected coordinate system, and thus the tool offset may be still found in the machining center in spite of the coordinate correction. Since the tilting head includes its own driver such as a spindle motor for rotating the tilting head as well as a main driver for linearly moving the tilting head, the assembly error, the operation error and the installation error of the spindle motor usually causes the deviation between a control center, which is set to be a rotation center of the tilting head in the numerical controller, and an actual center which is actually measured as a rotation center of the tilting head.

The variation of the rotation center of the tilting head necessarily causes the position change of the tip point of the tool, and thus the tool offset necessarily occur at the tip point of the tool that is combined to the tilting head in spite of the coordinate correction in the machining center. That is, when the tilting head is installed to a spindle assembly of the machining center, the position error between the control center and the actual center of the tilting head, which is widely known as a center error, is to be further corrected for the accurate offset correction of the tool as well as the coordinate correction.

Conventionally, the center error of the tiling head has been manually detected by using a center error detector, and then the center error is manually corrected by changing the point of the rotation center of the tilting head in the numerical controller according to the detected center error (center correction). The center error detector is made up of a measuring sphere for measuring the position of the rotation center of the tilting head and a detecting member for detecting the center error from the measured position of the tilting head. The measuring sphere is manually put on the table of the machining center in addition to the offset detector and the center error of the tilting head is manually detected by using the detecting member.

However, since the center error detector is necessarily installed to the table in addition to the offset detector whenever the offset correction is conducted, the preparation processes for the machining center requires high cost and time for the offset correction. In addition, the manual detection of the center error reduces the accuracy of the detected center error and the manual detection and correction becomes a significant obstacle to the automation of the center error detection and correction.

Accordingly, there has been a need for an improved device for automatic and accurate detection and correction of the center error of the tilting head.

SUMMARY

Example embodiments of the present inventive concept provide a position controller for controlling a rotation center of the tilting head such that the center error of the tilting head is automatically detected and the rotation center of the tilting head is automatically corrected on a basis of the automatically detected center error.

According to exemplary embodiments of the inventive concept, there is provided a position controller for controlling a rotation center of a rotating spindle to which a tool may be secured in a machining center. The position controller may include an offset attachment having a body combined to the rotating spindle and a spherical contact secured to the body, an offset detector built in the machining center such that the offset detector selectively may move out into a process area of the machining center and automatically may detect a tool offset from a contact point with the spherical contact as a position error of a tip point of the tool, a storing unit connected to the offset detector and individually storing at least a pair of first and second tool offsets by respective rotation positions of the rotating spindle, and an operator connected to the storing unit and generating a transform offset of the first tool offset by a rotational transform and a center error vector from the transform offset and the second tool offset.

In example embodiments, the position of the machining center may be designated by a corrected coordinate system in which a control position of the tip point of the tool in a numerical controller of the machining center may coincide with an actual position thereof through a coordinate correction and the first and the second tool offsets may be detected from first and second rotation positions, respectively, at which the rotating spindle may be rotated at first and second rotation angles, respectively, in the corrected coordinate system.

In example embodiments, the operating unit may include a first transformer performing a rotational transform with respect to an actual center of the rotating spindle between the first and the second tool offsets, a second transformer performing the rotational transform to the first tool offset with respect to a control center of the rotating spindle to thereby generate the transform offset and an error vector generator generating the error vector from the transform offset and the second tool offset as a following equation (1).

$$\begin{pmatrix} x_2 - x_c \\ z_2 - z_c \end{pmatrix} = \begin{pmatrix} \alpha \\ \beta \end{pmatrix} - \begin{pmatrix} \cos(\theta_2 - \theta_1) & \sin(\theta_2 - \theta_1) \\ -\sin(\theta_2 - \theta_1) & \cos(\theta_2 - \theta_1) \end{pmatrix} \begin{pmatrix} \alpha \\ \beta \end{pmatrix} \quad (1)$$

(wherein, $(x_1, z_1)$ and $(x_2, z_2)$ is coordinate values of the first and the second tool offsets and $(x_c, z_c)$ is a coordinate value of the transform offset in the corrected coordinate system, and $\theta 1$ and $\theta 2$ are the first and second rotation angles, respectively.)

In example embodiments, the first tool offset may include a horizontal offset of the rotating spindle on condition that the rotating spindle may be arranged in parallel with a table of the machining center at the first angle of 0° and the second tool offset may include a vertical offset of the rotating spindle on condition that the rotating spindle may be arranged perpendicular to the table of the machining center at the second angle of 90°.

In example embodiments, the transform offset of the first tool offset may be obtained as a following equation (2) by the rotational transform and the center error vector may be obtained as a following equation (3) from the first and second tool offsets.

$$\begin{pmatrix} x_c \\ z_c \end{pmatrix} = \begin{pmatrix} \cos(270) & \sin(270) \\ -\sin(270) & \cos(270) \end{pmatrix} \begin{pmatrix} x_1 \\ z_1 \end{pmatrix} = \begin{pmatrix} -z_1 \\ x_1 \end{pmatrix} \quad (2)$$

$$\begin{pmatrix} \alpha \\ \beta \end{pmatrix} = \begin{pmatrix} \frac{(x_2 - x_1) + (z_2 + z_1)}{2} \\ \frac{(z_2 + x_1) - (z_2 - z_1)}{2} \end{pmatrix} \quad (3)$$

In example embodiments, the position controller may further include a driving unit for driving the rotating spindle in such a way that the center error vector may be eliminated and a control center of the rotating spindle in a numerical controller of the machining center may coincide with an actual center thereof.

According to example embodiments of the present inventive concept, the first and the second tool offsets may be automatically obtained by using the offset detector in the coordinate system which may be corrected by the coordinate correction and the center error of the tilting head may be automatically generated and corrected by using the first and the second offsets and the rotational transform thereof. Thus, the center error of the tilting head may be automatically generated into the error vector through the center correction algorithm based on the rotational transform of the first and the second tool offsets, and the center of the tilting head may be automatically corrected through the center correction algorithm in such a way that the error vector may be eliminated. Therefore, the center error of the tilting head may be automatically detected and corrected by the position controller.

Particularly, the center error of the tilting head S may be automatically and accurately obtained just by using the offset detector TO without any additional center error detectors and complicated processes, thereby significantly increasing the manufacturing accuracy and efficiency of the machining center. The center correction just requires the automatic installation of the offset attachment to the tilting head by the automatic tool changer (ATC) and the automatic detection of a pair of the first and the second tool offsets at different rotation positions of the tilting head by using the built-in offset detector, so both of the detection of the center error and the correction of the center error may be automatically conducted in the machining center.

DESCRIPTION OF THE DRAWINGS

These and other features of the inventive concept will become more apparent by describing in detail exemplary embodiments thereof with reference to the accompanying drawings of which.

DETAILED DESCRIPTION OF THE EMBODIMENTS

Figure 1:
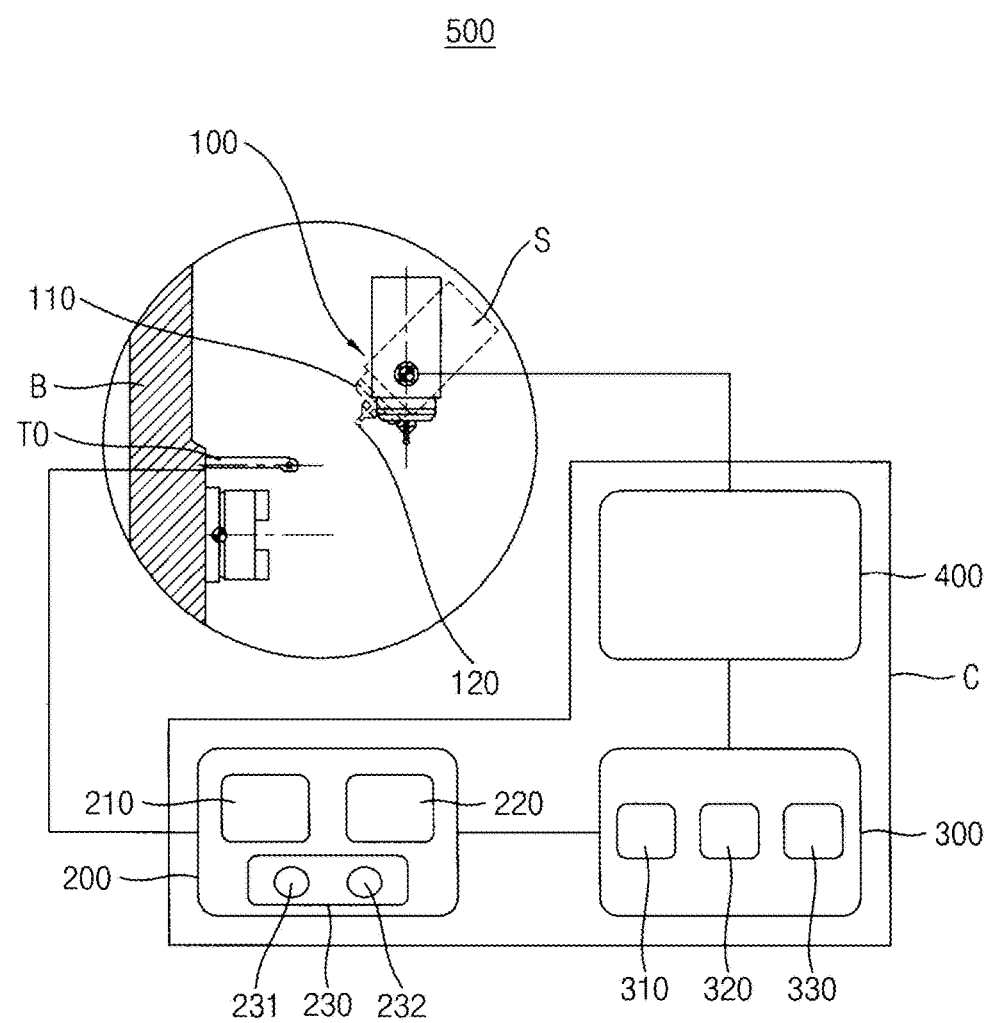
FIG. 1 is a structural view illustrating a position controller for controlling a rotation center of a tilting head in accordance with an example embodiment of the present inventive concept.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, and/or sections, these elements, components, regions, and/or sections should not be limited by these terms. These terms are only used to distinguish one element, component, region, and/or section from another element, component, region, and/or section. For example, a first element, component, region, and/or section could be termed a second element, component, region, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a structural view illustrating a position controller for controlling a rotation center of a tilting head in accordance with an example embodiment of the present inventive concept.

Referring to FIG. 1, a position controller 500 for controlling a rotation center of a rotating spindle S in accordance with an example embodiment of the present inventive concept may include an offset attachment 100 having a body 110 combined to the rotating spindle S and a spherical contact 120 secured to the body 110, an offset detector TO built in the machining center such that the offset detector TO may selectively move out into a process area of the machining center and automatically detects a tool offset from a contact point with the spherical contact 120 as a position error of a tip point of the tool and a center corrector C automatically obtaining a center error of the rotating spindle from a pair of the tool offsets and automatically correcting the center error.

For example, the offset attachment 100 may include the body 110 that may be combined to the rotating spindle S and the spherical contact 120 that may be secured to the body 110. The rotating spindle S may constitute a spindle assembly in a machining center and may be rotated with respect to its own rotational axis just like a tilting head. The tool for machining an object may be combined to the tiling head, so that the tool itself may be rotated in accordance with the rotation of the tilting head. While the present example embodiment discloses the tilting head as the rotating spindle, any other spindles may be used for the rotating spindle as long as the spindle may be rotated with respect to its own rotational axis.

The offset attachment 100 may be arranged in a tool box together with any other tools and may be automatically combined to the spindle assembly of the machining center by an automatic tool changer (ATC). When the center correction may be required as well as the coordination correction for the accurate offset correction of the tool in the machining center, the offset attachment 100 is automatically selected and combined to the spindle assembly of the machining center.

For example, when the center correction may be required for the offset correction, the numerical controller may drive the automatic tool changer (ATC) to select the offset attachment 100 from the tool box (not shown) and may combine the offset attachment 100 with the rotating spindle S. In the present example embodiment, the body 110 of the offset attachment 100 may be combined to the tilting head of the spindle assembly for the center correction.

The spherical contact 120 such as a contact ball may be secured to a tip point of the body 110 and may make contact with the offset detector TO. Thus, the spherical contact 120 may be positioned at a tip point of the tool as if the tool might be combined to the tilting head. Therefore, the offset detector may obtain the tool offset just by detecting the position of the spherical contact 120. Particularly, since the spherical contact 120 may be shaped into a sphere, the gap distance between the offset detector TO and the spherical contact 120 may be unchanged regardless of the rotation of the rotating spindle S such as the tilting head.

Since the tilting head may be rotated with respect to its own rotation axis, the contact point between the spherical contact 120 and the offset detector TO may be varied according to the rotation angle of the tilting head. However, since the radius of the spherical contact 120 may be unchanged regardless of the contact point thereof, the gap distance between the offset detector TO and the spherical contact 120 may be unchanged and maintained as a constant although the rotating spindle S may be rotated. That is, the tool offset may be detected by using the offset detector TO independently from the rotation angle of the tilting head.

In the present example embodiment, the rotating spindle such as the tilting head may be provided as the spindle assembly of the machining center and the tool for processing the object may be automatically combined to the tilting head. Thereafter, the object on the table may be processed by the relative motions between the object and the tool. In such a case, the tool may linearly move in three-dimensional space along longitudinal z, latitudinal y and height directions and may be slanted with respect to the object by the rotation of the tilting head.

At first, an actual position of the tool may be automatically detected by the offset detector TO and then the actual position of the tool may be compared with a control position of the tool that may be calculated by the numerical controller of the machining center. The position error of the tool between the control position and the actual position may be detected as the tool offset. The tool offset may be corrected prior to the process to the object by the coordinate correction, thereby preventing the tool interferences to the object due to the position error of the tip point of the tool.

In the present example embodiment, the numerical controller may shift or reset the origin of the virtual coordinate system in such a way that the automatically detected tool offset may be eliminated. Thus, the coordinate correction may make the control position coincide with the actual position in the machining center, and the numerical controller may designate coordinates based on the corrected coordinate system in the following machining process.

The offset detector TO may be provided as a built-in detector in a body B of the machining center and may move out toward or back from a process area of the bed of the machining center. For example, the offset detector TO may be arranged at an inside of the body B and may include a guiding bar onto which the spherical contact may make contact with and a driving cylinder for driving the guiding bar to move out or back. The offset detector may move out toward the process area of the bed just when the tool offset may be required for the offset correction and may move back from the process area and buried again in the body B when completing the tool offset detection. That is, the offset detector TO may be built in the body B of the machining center and selectively move out onto the process area just for the automatic detection of the tool offset.

Particularly, the offset detector TO may include at least a head sensor (not shown) for detecting coordinate points of a contact point between the spherical contact 120 and the guiding bar. The offset detector TO may obtain the tool offset from the coordinate points of the contact point. The detected tool offset may be transferred to the numerical controller of the machining center.

When completing the coordinate correction by using the offset detector TO, an automatic center correction may be conducted at the center corrector C by using the offset detector TO under the corrected coordinate system. That is, the position error between the control center and the actual center of the tilting head, which is referred to as center error of the tilting head, may be automatically detected by using the offset detector TO. Then, the center error of the tilting head may be automatically corrected in such a way that the center error may be eliminated by the center corrector C.

For example, the center corrector C may include an offset data processor 200 connected to the offset detector TO and individually storing at least a pair of first and second tool offsets that may be detected from first and second rotation positions of the tilting head S, respectively, an operator 300 connected to the offset data processor 200 and generating a transform offset of the first tool offset by a rotational transform and a center error vector from the transform offset and the second tool offset and a driver 400 for driving the tilting head S in such a way that the center error vector may be eliminated and the control center may coincide with the actual center of the tilting head S.

The offset data processor 200 may include an angle memory 210 that may be connected to an operation panel of the numerical controller and into which the rotation angle θ of the rotating spindle S such as the tilting head may be stored, a signal generator 220 generating driving signals for driving the rotating spindle S and the offset detector TO in response to the rotation angle θ and an offset memory 230 that may be connected to the head sensor of the offset detector TO and into which the detected tool offsets may be individually stored in accordance with the respective rotation angle θ.

The rotation angle θ may be manually set up through the operation panel of the numerical controller or may be algorithmically generated by the numerical controller. The rotational angle θ may be stored in the angle memory 210. For example, the angle memory 210 may include a semiconductor memory device such as a flash memory device and a dynamic random access memory (DRAM) device.

In the present example embodiment, a pair of first and second tool offsets may be detected at different contact points of the spherical contact with the offset detector TO, respectively. Thus, the first tool offset may be detected at a first contact point where the rotating spindle S or the tilting head may be rotated at a first rotation angle θ1 and the second tool offset may be detected at a second contact point where the rotating spindle S or the tilting head may be rotated at a second rotation angle θ2. The first and second tool offsets may be stored into the angle memory 210 in connection with the respective rotation angle θ.

The signal generator 220 may generate the driving signals for driving the rotation spindle S and the offset detector TO in response to a center correction signal. When the center correction signal may be detected by the numerical controller of the machining center, the offset attachment 100 may be combined to the tilting head of the spindle assembly, and then the signal generator 220 may generate a spindle driving signal for driving the tilting head and a detector driving signal for driving the offset detector TO.

Thus, the tilting head S may be rotated to a preset rotation angle θ in response to the spindle driving signal and the offset detector TO may move out into the process area on the table from the body B of the machining center in response to the detector driving signal. In the present example embodiment, the tilting head may be firstly rotated to the first rotation angle θ1 and the offset detector TO may be ready for the detection of the first tool offset in the process area of the table.

Particularly, the tilting head may be rotated on an x-z plane the Cartesian coordinate system that may be corrected by the coordinate correction. The rotation plane of the tilting head may be selective according to the establishment of the coordinate system and the configurations of the machining center. For example, the tilting head may be configured to be rotated on a y-z plane of the Cartesian coordinate system.

The titling head S may be positioned at the first rotation angle θ1 and the spherical contact 120 that may be combined with the tilting head S may make contact with the offset detector TO in the process area of the table. Then, the offset detector TO may detect the first tool offset from the contact point of the spherical contact 120 and the first tool offset may be stored in a first memory 231 of the offset memory 230.

For example, the spherical contact 120 may make contact with the head sensor of the offset detector TO on the x-z plane under the condition that the tilting head may be positioned at the first rotation angle θ1, and the coordinate values of the contact point may be detected as the first tool offset having the coordinate values (x1, z1). The head sensor of the offset detector TO may detect the x and z coordinate values at the moment that the spherical contact 120 may make contact with the head sensor.

Then, the spherical contact 120 may be separated from the offset detector TO and the tilting head may be further rotated to the second rotation angle θ2 in response to the spindle driving signal. When completing the rotation to the second rotation angle θ2, the spherical contact 120 may make again contact with the head sensor of the offset detector TO on the x-z plane under the condition that the tilting head may be positioned at the second rotation angle θ2. The coordinate values of the contact point may be detected as the second tool offset having the coordinate values (x2, z2) in the same way as the first tool offset (x1,z1). The second tool offset may be stored in a second memory 232 of the offset memory 230.

The first and the second memories 231 and 232 may be individually connected to the angle memory 210, so the first tool offset (x1, z1) and the first rotation angle θ1 may be tagged with each other and stored in the first memory 231. In the same way, the second tool offset (x2, z2) and the second rotation angle θ2 may be tagged with each other and stored in the second memory 232.

Figure 2A:
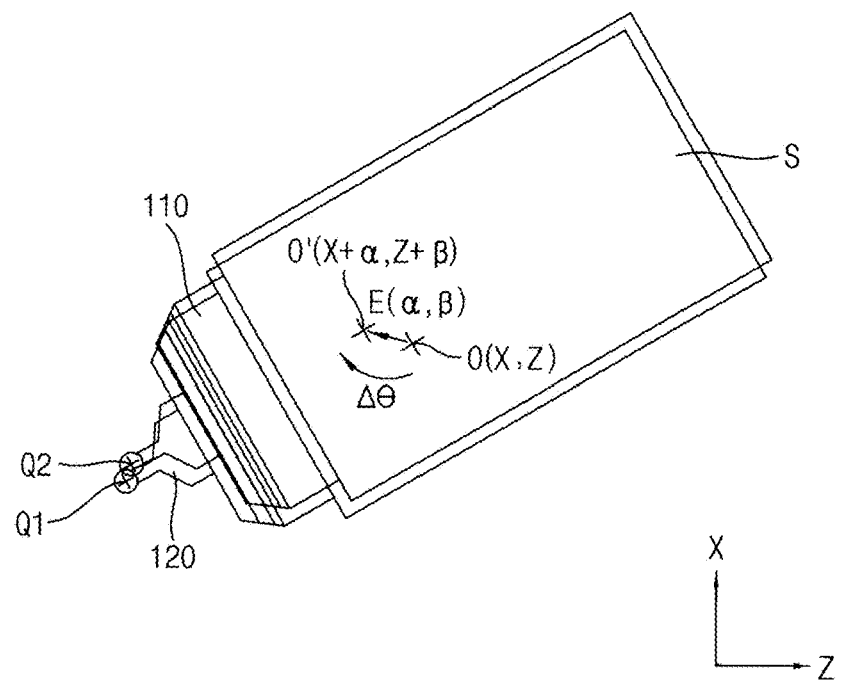
FIG. 2A is a view illustrating the center error of the tilting head shown in FIG. 1 due to the rotation thereof.
Figure 2B:
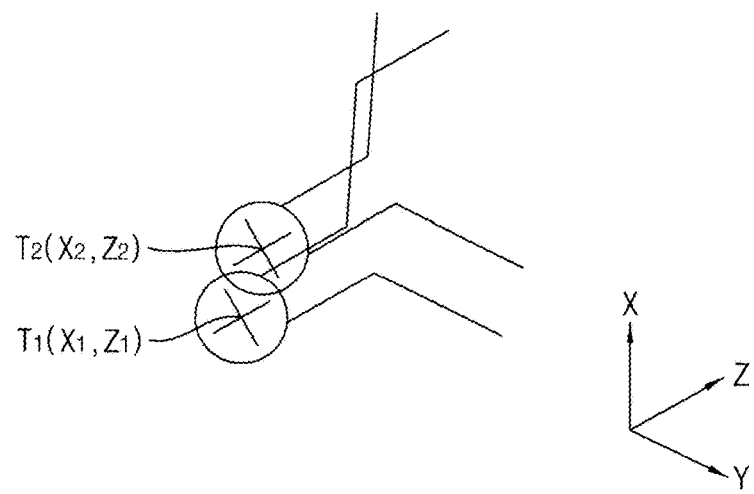
FIG. 2B is a view illustrating the deviation of the tool offset due to the rotation of the tilting head shown in FIG. 1.

FIG. 2A is a view illustrating the center error of the tilting head shown in FIG. 1 due to the rotation thereof and FIG. 2B is a view illustrating the deviation of the tool offset due to the rotation of the tilting head shown in FIG. 1.

Referring to FIGS. 2A and 2B, the actual center O'(X+α, Z+β) of the tilting head S may not coincide with the control center O(X, Z) of the tilting head due to the assembly error, the operation error and the installation error of the tilting head S itself. The control center O of the tilting head S may be a rotation center of the tilting head S that may be algorithmically calculated in the corrected coordinate system through the coordinate correction in the numerical controller and the actual center of the tilting head S may be a rotation center of the tilting head S that may be automatically obtained by the offset detector TO. Thus, the control center may be deviated from the actual center as distant as an error vector E(α, β).

A pair of the tool offsets may be detected by using the offset detector TO before and after the rotation of the tilting head S and the center corrector C may obtain the error vector E(α, β) in relation to the angle variation Δθ of the tilting head S.

Supposing that the tilting head S may be rotated from a first rotation position having the control center O(X, Z) to a second rotation position having the actual center O'(X+α, Z+β). The first rotation position of the tilting head S may be rotated from a reference position at a first rotation angle θ1 and the second rotation position of the tilting head S may be rotated from the reference position at a second rotation angle θ2. In case that no center error may occur in the tilting head S, the control center might necessarily coincide with the actual center. However, the actual center O'(X+α, Z+β) may be deviated from the control center O(X, Z) due to the rotation of the tilting head S as much as the angle variation Δθ corresponding to the difference between the first and second angles θ1 and θ2.

When the tilting head S may be located at the first rotation position, the contact point of the spherical contact 120 with the offset detector TO may be detected as the first tool offset T1(x1, z1). In addition, when the tilting head S may be located at the second rotation position, the contact point of the spherical contact 120 with the offset detector TO may be detected as the second tool offset T2(x2, z2). In case that the tilting head S may have no inherent error, the first and second tool offsets T1 and T2 might necessarily coincide with each other regardless of the rotation position of the tilting head S. However, since the tilting head S may have any inherent errors such as the assembly error, the operation error and the installation error, the control center may be deviated from the actual center and the first and the second tool offsets T1 and T2 may be different from each other.

The operator 300 may generate the error vector E(α, β) from the second tool offset T2 and a transform offset that may be obtained by a rotational transform of the first tool offset T1 to the second rotation position of the tilting head S. The error vector E (α,β) may be calculated as a position error between the second tool offset T2 and the transform offset.

For example, the operator 300 may include a first transformer 310 for performing a rotational transform with respect to the actual center of the tilting head S between the first and the second tool offsets T1 and T2, a second transformer 320 for performing a rotational transform to the first tool offset T1 with respect to the control center of the tilting head S to thereby generate the transform offset Tc and an error vector generator 330 for generating the error vector E (α,β) from the transform offset Tc and the second tool offset T2.

The first transformer 310 may generate the relations between the first and the second tool offsets T1 and T2 by the rotational transform with respect to the actual center of the tilting head S. The tool offset of the tool may be changed from the first tool offset T1 to the second tool offset T2 as the tilting head S may be rotated clockwise from the first rotation position, which may be characterized by the first rotation angle θ1, to the second rotation position, which may be characterized by the second rotation angle θ2, with respect to the actual center O'(X+α, Z+β).

Thus, the second tool offset T2 may be related with the first tool offset T1 by the rotational transform, as the following equations (1) and (2).

$$\begin{pmatrix} x_2 - (X+\alpha) \\ z_2 - (Z+\beta) \end{pmatrix} = \begin{pmatrix} \cos(-\Delta\theta) & -\sin(-\Delta\theta) \\ \sin(-\Delta\theta) & \cos(-\Delta\theta) \end{pmatrix} \begin{pmatrix} x_1 - (X+\alpha) \\ z_1 - (Z+\beta) \end{pmatrix} = \begin{pmatrix} \cos\Delta\theta & \sin\Delta\theta \\ -\sin\Delta\theta & \cos\Delta\theta \end{pmatrix} \begin{pmatrix} x_1 - (X+\alpha) \\ z_1 - (Z+\beta) \end{pmatrix} (\Delta\theta = \theta 2 - \theta 1). \quad (1)$$

Denoting a transfer matrix of the clockwise rotational transform by a capital letter 'R', the transfer matrix may be described as follows.

$$R = \begin{pmatrix} \cos\Delta\theta & \sin\Delta\theta \\ -\sin\Delta\theta & \cos\Delta\theta \end{pmatrix}$$

Thus, equation (1) may be described into equation (2) by using the transfer matrix R.

$$\begin{pmatrix} x_2 - (X+\alpha) \\ z_2 - (Z+\beta) \end{pmatrix} = R \begin{pmatrix} x_1 - (X+\alpha) \\ z_1 - (Z+\beta) \end{pmatrix} \quad (2)$$

The second transformer 320 may perform the rotational transform to the first offset T1 to the second rotation position from the first rotation position with respect to the control center of the tilting head S, thereby generating the transform offset in the virtual corrected coordinate system of the numerical controller. Thus, the transform offset may indicate a virtual position error of the tool when the first offset may be transferred by the rotation of the tilting head S under the condition that the tilting head S may have no inherent errors and thus the actual center may coincide with the control center.

Thus, the transform offset $T_c (x_c, z_c)$ of the first tool offset T1 may be obtained by the second transformer 320 as described in equation (3).

$$\begin{pmatrix} x_c - X \\ z_c - Z \end{pmatrix} = R \begin{pmatrix} x_1 - X \\ z_1 - Z \end{pmatrix} \quad (3)$$

The error vector generator 330 may obtain the error vector E from the second tool offset T2 and the transform offset Tc. The first tool offset T1 may be rotated into the transform offset Tc when rotating with respect to the control center O of the tilting head S. In contrast, the first tool offset T1 may be rotated into the second offset T2 when rotating with respect to the actual center O' of the tilting head S.

Therefore, the difference between the second tool offset T2 and the transform offset Tc may indicate the rotation error between the second tool offset T2 and the transform offset Tc in the clockwise rotation of the tilting head S, which may be generated into the error vector E (α, β), as described in equations (4) and (5).

$$\begin{pmatrix} x_2 - x_c \\ z_2 - z_c \end{pmatrix} = \begin{pmatrix} \alpha \\ \beta \end{pmatrix} - R \begin{pmatrix} \alpha \\ \beta \end{pmatrix} \quad (4)$$

$$\begin{pmatrix} x_2 - x_c \\ z_2 - z_c \end{pmatrix} = \begin{pmatrix} \alpha \\ \beta \end{pmatrix} - \begin{pmatrix} \cos(\theta_2 - \theta_1) & \sin(\theta_2 - \theta_1) \\ -\sin(\theta_2 - \theta_1) & \cos(\theta_2 - \theta_1) \end{pmatrix} \begin{pmatrix} \alpha \\ \beta \end{pmatrix} \quad (5)$$

As indicated in equations (4) and (5), the error vector E (α,β) may be a function of the rotation angle θ irrespective of the control center of the tilting head S. The first and the second tool offsets T1 and T2 may be automatically detected by the offset detector 100 and the rotation angle θ of the tilting head S may be automatically or manually preset in the center correction. Thus, the error vector E may be automatically obtained by the first and the second tool offsets T1 and T2 and the rotation angle.

Figure 3A:
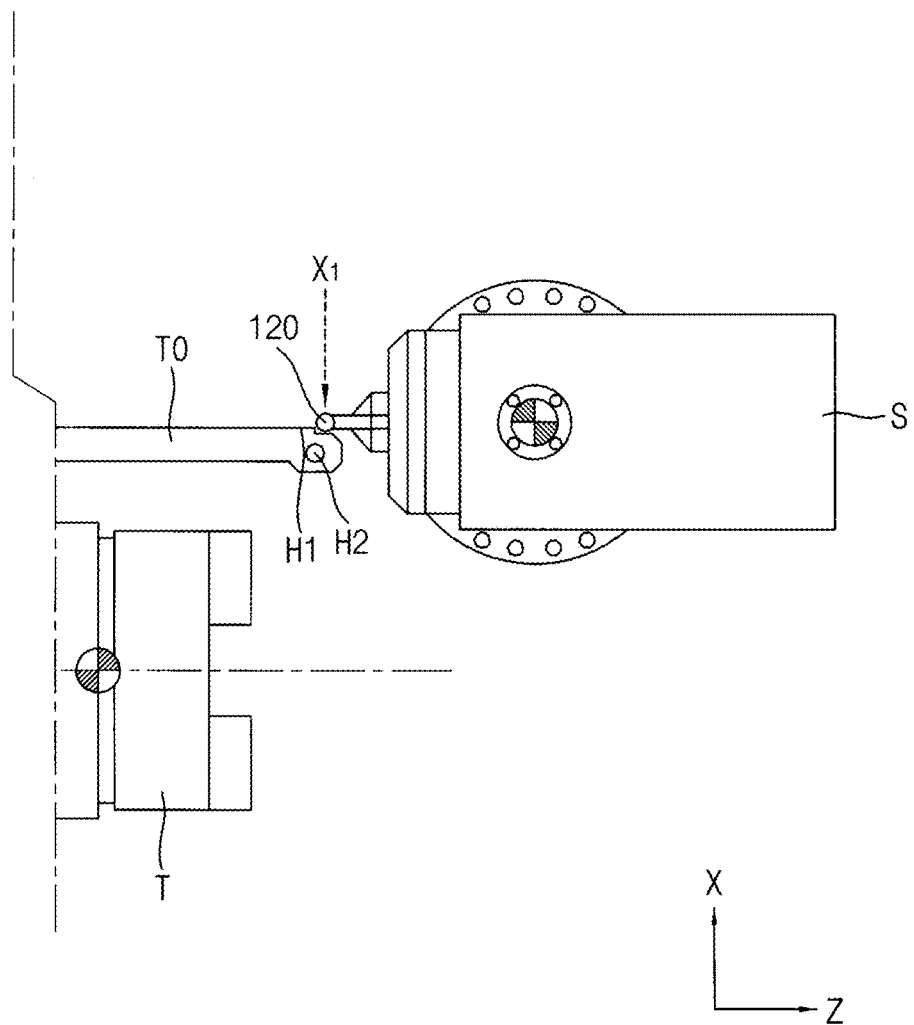
FIGS. 3A to 3D are views illustrating the processing steps for obtaining the error vector E when the rotating spindle S shown in FIG. 1 is rotated at an angle of about 90°.
Figure 3B:
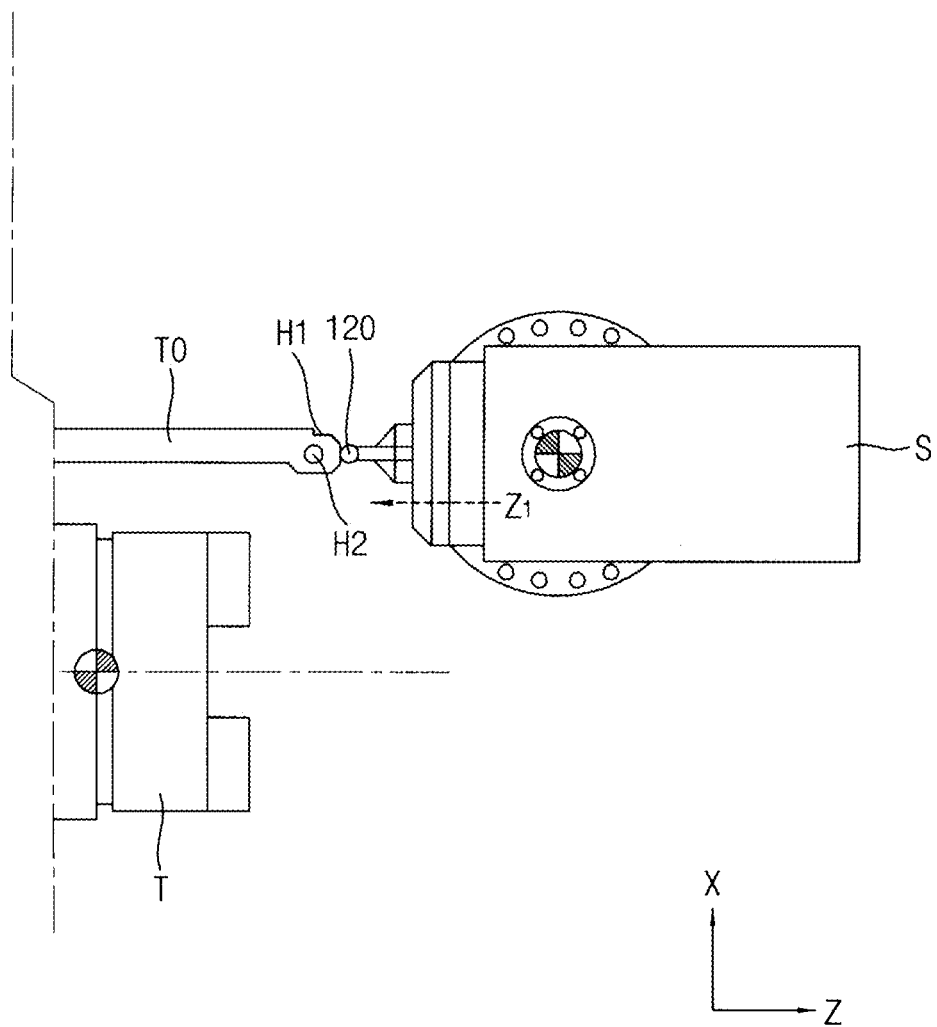
Figure 3C:
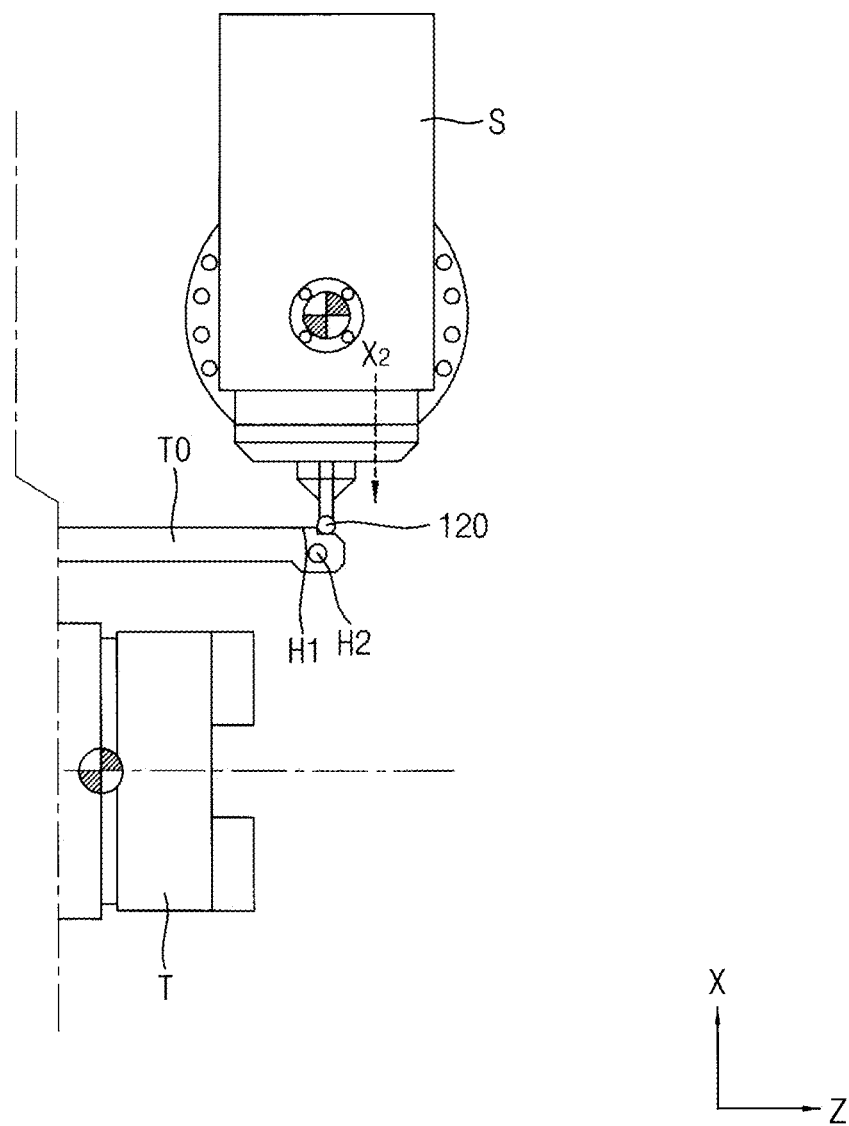
Figure 3D:
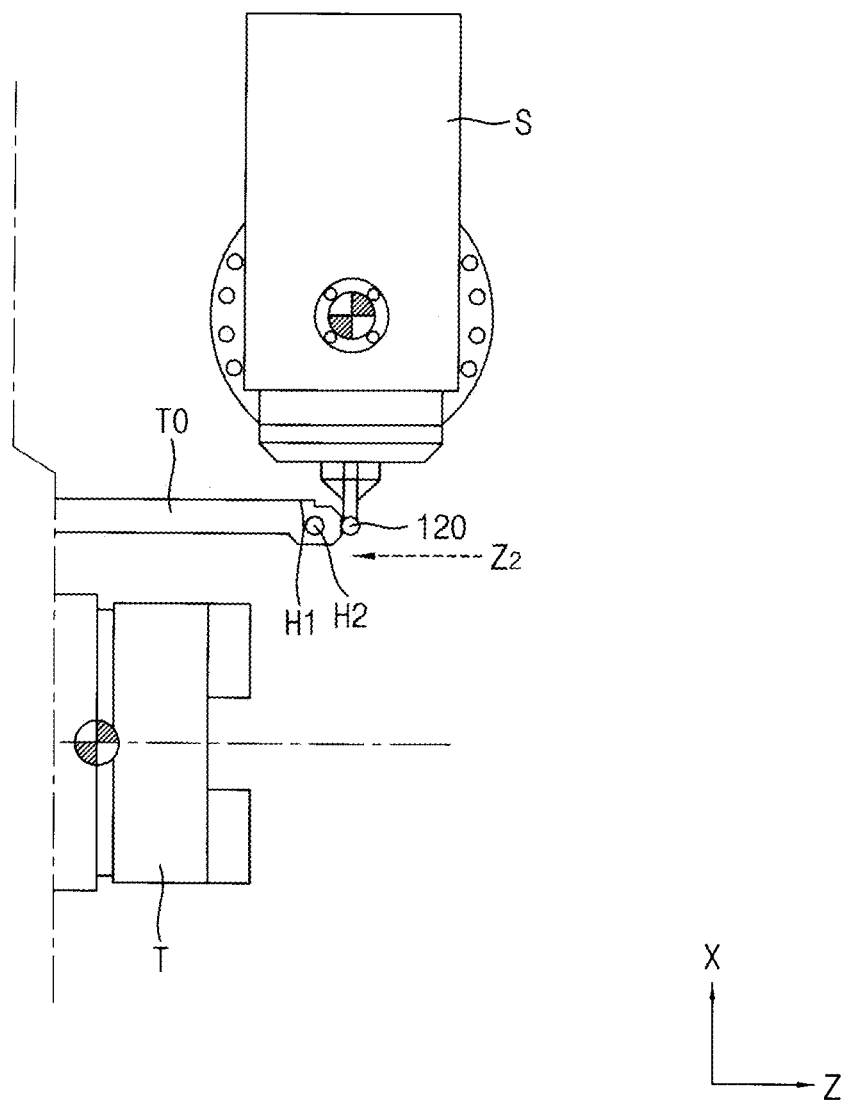

FIGS. 3A to 3D are views illustrating the processing steps for obtaining the error vector E when the rotating spindle S shown in FIG. 1 is rotated at an angle of about 90°. FIGS. 3A and 3B illustrate the detection of the first tool offset (horizontal offset) when the offset detector 100 may be arranged in parallel with the table of the machining center and the tilting head S of the machining center may be rotated at an angle of about 0° as the first rotation position of the tilting head S. FIGS. 3C and 3D illustrate the detection of the second tool offset (vertical offset) when the offset detector 100 may be arranged perpendicularly to the table of the machining center and the tilting head S of the machining center may be rotated at an angle of about 90° as the second rotation position of the tilting head S.

Referring to FIGS. 3A and 3B, the offset detector TO may be protruded from the body B of the machining center and may be arranged in parallel with the table and the rotating spindle S may be arranged at the first rotation angle θ1. Then, the spherical contact 120 may make contact with an x-axis head sensor H1 and a z-axis head sensor H2 of the offset detector TO, respectively. The detected position of the head sensors H1 and H2 may be obtained as the point of the first tool offset T1(x1, z1) at the first rotation position of the tilting head S. The coordinate values of the contact point between the spherical contact 120 and the guiding bar of the offset detector TO may be detected from the head sensors H1 and H2 at the moment that the spherical contact 120 may make contact with the head sensors H1 and H2 of the guide bar. The first tool offset T1(x1, z1) may be stored in the first memory 231.

Thereafter, the rotating spindle S may be rotated counter clockwise at the rotation angle of about 90° (that is, rotated clockwise at the rotation angle of −270°), so the tilting head S may be arranged at the second rotation position. Then, the spherical contact 120 may make again contact with the x-axis head sensor H1 and the z-axis head sensor H2 of the offset detector TO, respectively. Thus, the detected position of the head sensors H1 and H2 may be obtained as the point of the second tool offset T2(x2, z2) at the second rotation position of the tilting head S in the same way as the first tool offset T1(x1,z1). The second tool offset T2(x2, z2) may be stored in the second memory 232.

Supposing that the origin of the corrected virtual coordinate system of the numerical controller of the machining center may be set on a surface of the guiding bar of the offset detector TO, the transform offset Tc of the first tool offset (horizontal offset) may be obtained as following equation (6) by equation (3).

$$\begin{pmatrix} x_c \\ z_c \end{pmatrix} = \begin{pmatrix} \cos(270) & \sin(270) \\ -\sin(270) & \cos(270) \end{pmatrix} \begin{pmatrix} x_1 \\ z_1 \end{pmatrix} = \begin{pmatrix} -z_1 \\ x_1 \end{pmatrix} \quad (6)$$

As a result, the error vector E may be obtained as following equation (7) by equation (5)

$$\begin{pmatrix} \alpha \\ \beta \end{pmatrix} = \begin{pmatrix} \frac{(x_2 - x_1) + (z_2 + z_1)}{2} \\ \frac{(z_2 + x_1) - (z_2 - z_1)}{2} \end{pmatrix} \quad (7)$$

Therefore, the center error of the tilting head S may be automatically and accurately obtained as the error vector E just by using the offset detector TO without any additional center error detectors.

Since the error vector E may be automatically obtained in the error vector generator 330 of the operator 300, the rotation center of the tilting head S may be automatically corrected based on the error vector E, so the center error of the tilting head S may be automatically detected and corrected in center corrector C of the position controller 500.

The driving unit 400 may drive the tilting head S in such a way that the error vector E may be eliminated, so the control center and the actual center of the tilting head S may coincide with each other by the automatic center correction of the tilting head S. Since the position error of the tool may be already corrected by the coordinate correction, the relative position between the tool and the object may be set to be accurate on condition that the spindle assembly may be stationary mode. However, when the rotating spindle S such as the tilting head may be combined to the spindle assembly, the center correction may be further conducted to the tilting head S in such a way that the error vector E may be automatically detected and eliminated in the tilting head S. Accordingly, the control center and the actual center of the tilting head S may coincide with each other in the corrected coordinate system of the numerical controller in spite of the rotation of the tilting head S, so the tip point of the tool may be located at the accurate position without any interferences even though the tilting head S may be installed to the machining center for a 5-axis machining.

While the present example embodiment discloses that the driving unit 400 may be provided as an element of the position controller 500, the driving unit may also be provided as an element of the numerical controller. Thus, the driving unit 400 may be optionally provided as the center correction C of the position controller 500.

The present example embodiment exemplarily discloses that the tilting head S may be rotated on the x-z plane of the coordinate system shown in FIGS. 2A and 2B, so the rotational transform between the actual center and the control center may be conducted on the x-z plane. However, the tilting head S would also be rotated on the y-z plane of the same coordinate system in FIGS. 2A and 2B, so the rotational transform between the actual center and the control center may also be conducted on the y-z plane.

According to the example embodiments of the position controller for controlling a rotation center of a tilting head, the first and the second tool offsets may be automatically obtained by using the offset detector in the coordinate system which may be corrected by the coordinate correction and the center error of the tilting head may be automatically generated and corrected by using the first and the second offsets and the rotational transform thereof. Thus, the center error of the tilting head may be automatically generated into the error vector through the center correction algorithm based on the rotational transform of the first and the second tool offsets, and the center of the tilting head may be automatically corrected through the center correction algorithm in such a way that the error vector may be eliminated. Therefore, the center error of the tilting head may be automatically detected and corrected by the position controller.

Particularly, the center error of the tilting head S may be automatically and accurately obtained just by using the offset detector TO without any additional center error detectors and complicated processes, thereby significantly increasing the manufacturing accuracy and efficiency of the machining center. The center correction just requires the automatic installation of the offset attachment to the tilting head by the automatic tool changer (ATC) and the automatic detection of a pair of the first and the second tool offsets at different rotation positions of the tilting head by using the built-in offset detector, so both of the detection of the center error and the correction of the center error may be automatically conducted in the machining center.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A position controller for controlling a rotation center of a tilting head to which a tool is secured in a machining center, comprising:
    an offset attachment having a body combined to the tilting head and a spherical contact secured to the body;
    an offset detector built in the machining center such that the offset detector selectively moves out into a process area of the machining center and automatically detects a tool offset from a contact point with the spherical contact as a position error of a tip point of the tool;
    an offset data processor connected to the offset detector and individually storing at least a pair of first and second tool offsets that are respectively detected from first and second rotation positions of the tilting head of the rotating spindle; and
    an operator connected to the offset data processor and obtaining an center error between an actual position of the rotation center and a control position of the rotation center that is algorithmically calculated in the numerical controller by a difference of rotational transforms of the first tool offset between when the tilting head is rotated with respect to the actual position and when the tilting head is rotated with respect to the control position.

2. The position controller of claim 1, wherein the machining center is under a corrected coordinate system through a coordinate correction such that a control position of the tip point of the tool coincides with an actual position thereof and tilting head is rotated at first and second rotation angles from the first and the second rotation positions, respectively, under the corrected coordinate system.

3. The position controller of claim 2, wherein the operator includes:

a first transformer performing a rotational transform with respect to the actual position of the rotation center of the tilting head between the first rotation position and the second rotation position, thereby generating a relationship between the first and the second tool offsets as a following equation (1)

$$\begin{pmatrix} x_2 - (X+\alpha) \\ z_2 - (Z+\beta) \end{pmatrix} = \begin{pmatrix} \cos\Delta\theta & \sin\Delta\theta \\ -\sin\Delta\theta & \cos\Delta\theta \end{pmatrix} \begin{pmatrix} x_1 - (X+\alpha) \\ z_1 - (Z+\beta) \end{pmatrix}; \quad (1)$$

(wherein $(x_1, z_1)$ and $(x_2, z_2)$ are coordinate values of the first and the second tool offsets that are detected by the offset detector supposing that the coordinate of the control position be $(X, Y)$ and the coordinate of the actual position be $(X+\alpha, Y+\beta)$ under the corrected coordinate system and $\Delta\theta$ is an angle difference between the first angle and the second angle supposing that the first and the second angles be measured clockwise)

a second transformer performing a rotational transform with respect to the control position of the rotation center of the tilting head from the first rotation position to the second rotation position by the angle difference, thereby generating a transform offset as a following equation (2)

$$\begin{pmatrix} x_c - X \\ z_c - Z \end{pmatrix} = \begin{pmatrix} \cos\Delta\theta & \sin\Delta\theta \\ -\sin\Delta\theta & \cos\Delta\theta \end{pmatrix} \begin{pmatrix} x_1 - X \\ z_1 - Z \end{pmatrix} \quad (2)$$

and an error vector generator generating the center error by calculating a difference between the transform offset and the second tool offset as an error vector by a following equation (3)

$$\begin{pmatrix} x_2 - x_c \\ z_2 - z_c \end{pmatrix} = \begin{pmatrix} \alpha \\ \beta \end{pmatrix} - \begin{pmatrix} \cos\Delta\theta & \sin\Delta\theta \\ -\sin\Delta\theta & \cos\Delta\theta \end{pmatrix} \begin{pmatrix} \alpha \\ \beta \end{pmatrix} \quad (3)$$

(wherein, $(x_c, z_c)$ is a coordinate value of the transform offset.

4. The position controller of claim 3, wherein the first tool offset includes a horizontal offset of the tilting head on condition that the tilting head is arranged in parallel with a table of the machining center at the first angle of 0° and the second tool offset includes a vertical offset of the tilting head on condition that the tilting head is arranged perpendicular to the table of the machining center at the second angle of 90°.

5. The position controller of claim 4, wherein the transform offset is obtained as a following equation (4) by the rotational transform and the center error is obtained as the error vector $(\alpha, \beta)$ by a following equation (5)

$$\begin{pmatrix} x_c \\ z_c \end{pmatrix} = \begin{pmatrix} \cos(270) & \sin(270) \\ -\sin(270) & \cos(270) \end{pmatrix} \begin{pmatrix} x_1 \\ z_1 \end{pmatrix} = \begin{pmatrix} -z_1 \\ x_1 \end{pmatrix} \quad (4)$$

$$\begin{pmatrix} \alpha \\ \beta \end{pmatrix} = \begin{pmatrix} \dfrac{(x_2 + x_1) - (z_2 - z_1)}{2} \\ \dfrac{(x_2 - x_1) + (z_2 + z_1)}{2} \end{pmatrix}. \quad (5)$$

6. The position controller of claim 1, further comprising a driving unit for driving the tilting head in such a way that the actual position of the rotation center coincides the control position of the rotation center in a numerical controller of the machining center.

\* \* \* \* \*